(12) United States Patent
Naito et al.

(10) Patent No.: US 12,145,432 B2
(45) Date of Patent: Nov. 19, 2024

(54) MOUNTING STRUCTURE FOR FUEL CELL DRIVE SYSTEM

(71) Applicant: HONDA MOTOR CO., LTD., Tokyo (JP)

(72) Inventors: Hideharu Naito, Wako (JP); Kohei Kakuta, Wako (JP); Hiroyoshi Suzuki, Wako (JP); Kazuhito Hattori, Wako (JP); Hirotaka Yokota, Wako (JP); Takayuki Nishiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 339 days.

(21) Appl. No.: 17/678,351

(22) Filed: Feb. 23, 2022

(65) Prior Publication Data

US 2022/0289013 A1    Sep. 15, 2022

(30) Foreign Application Priority Data

Mar. 11, 2021  (JP) ................................ 2021-039555

(51) Int. Cl.
  *B60K 1/04*    (2019.01)
  *B60L 50/71*   (2019.01)
  *B62D 21/11*   (2006.01)
(52) U.S. Cl.
  CPC ............... *B60K 1/04* (2013.01); *B60L 50/71* (2019.02); *B62D 21/11* (2013.01)
(58) Field of Classification Search
  CPC ............ B60K 1/04; B60L 50/71; B62D 21/11
  See application file for complete search history.

(56) References Cited

U.S. PATENT DOCUMENTS

| 6,994,178 | B2 * | 2/2006 | Mizuno ................... B60K 1/04 180/312 |
| 8,459,385 | B2 * | 6/2013 | Katano |
| 2016/0207386 | A1 * | 7/2016 | Nagaosa .................. B60K 1/04 |
| 2017/0117570 | A1 | 4/2017 | Ishikawa et al. |
| 2020/0067108 | A1 | 2/2020 | Yoshitomi et al. |

FOREIGN PATENT DOCUMENTS

| JP | 2017-081209 A | 5/2017 |
| JP | 2018-133249 A | 8/2018 |
| JP | 2020-029190 A | 2/2020 |

OTHER PUBLICATIONS

Office Action dated Jan. 10, 2023 issued over the corresponding Japanese Patent Application No. 2021-039555 with the English translation thereof.

* cited by examiner

*Primary Examiner* — James A Shriver, II
*Assistant Examiner* — Nicholas R. Kandas
(74) *Attorney, Agent, or Firm* — Shende & Associates P.C.; Joseph P. Carrier; Fulchand P. Shende

(57) ABSTRACT

In a mounting structure for a fuel cell drive system, a mount member includes a first mount and a second mount. The first mount connects the first end of a stack case to the first frame. The second mount connects the second end of an auxiliary device case to the second frame. The fuel cell drive system includes a first connecting member and a second connecting member. The first connecting member connects the stack case and a motor to each other. The second connecting member connects the auxiliary device case and a speed reducer to each other.

5 Claims, 10 Drawing Sheets

FIG. 4

MOUNTING STRUCTURE FOR FUEL CELL DRIVE SYSTEM

CROSS-REFERENCE TO RELATED APPLICATIONS

This application is based upon and claims the benefit of priority from Japanese Patent Application No. 2021-039555 filed on Mar. 11, 2021, the contents of which are incorporated herein by reference.

BACKGROUND OF THE INVENTION

Field of the Invention

The present invention relates to a mounting structure for a fuel cell drive system.

Description of the Related Art

For example, JP 2018-133249 A discloses a mounting structure for a fuel cell drive system. The fuel cell drive system includes a drive unit (a motor and a speed reducer) and a fuel cell system. The drive unit is mounted on the vehicle body frame. The fuel cell system is located above the drive unit. The drive unit and the fuel cell system are connected to each other by a plurality of brackets.

SUMMARY OF THE INVENTION

The mounting structure disclosed in JP 2018-133249 A does not include a mount for connecting the fuel cell system to the vehicle body frame. In this case, the total load of the fuel cell system and the drive unit is concentrated on the vehicle body frame supporting the drive unit. Therefore, it is necessary to reinforce the vehicle body frame that supports the drive unit, which may increase the weight of the vehicle body frame.

An object of the present invention is to solve the above-described problems.

In an aspect of the present invention, a mounting structure for fuel cell drive system, includes: a fuel cell drive system including a fuel cell system including a stack case that houses a fuel cell stack and an auxiliary device case that houses a fuel cell auxiliary device and is connected to the stack case, and a drive unit configured to drive a vehicle; and a mount member configured to fix the fuel cell drive system to a vehicle body frame in a state in which the stack case and the auxiliary device case are arranged alongside of each other in a vehicle width direction, wherein the drive unit includes a motor disposed under the stack case and a speed reducer disposed under the auxiliary device case and connected to the motor in the vehicle width direction, the mount member includes a first mount connecting a first end forming an end of the stack case as one end of the fuel cell system in the vehicle width direction, to a first frame of the vehicle body frame, and a second mount connecting a second end forming an end of the auxiliary device case as another end of the fuel cell system in the vehicle width direction to a second frame of the vehicle body frame, and the fuel cell drive system includes a first connecting member connecting the stack case and the motor to each other and a second connecting member connecting the auxiliary device case and the speed reducer to each other.

According to the present invention, the first connecting member connects the stack case and the motor to each other. Further, the second connecting member connects the auxiliary device case and the speed reducer to each other. Further, the first mount connects the first end of the fuel cell system to the first frame. A second mount connects the second end of the fuel cell system to the second frame. Therefore, the load of the fuel cell drive system can be supported by the first frame and the second frame. That is, the entire load of the fuel cell drive system is distributed to the first frame and the second frame without being locally concentrated on the vehicle body frame. This makes it possible to reduce the weight of the vehicle body frame.

The first mount connects the stack case and the first frame. Therefore, the stack case also functions as a stack support member that supports the fuel cell stack. Thus, it is not necessary to separately provide a stack support member. Further, the second mount connects the auxiliary device case and the second frame. Therefore, the auxiliary device case also functions as an auxiliary device support member that supports the fuel cell auxiliary device. Therefore, it is not necessary to separately provide an auxiliary device support member. Therefore, the fuel cell drive system can be reduced in size.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a rear view of the mounting structure as viewed from the rear of the vehicle.

DESCRIPTION OF THE INVENTION

First Embodiment

Figure 6:
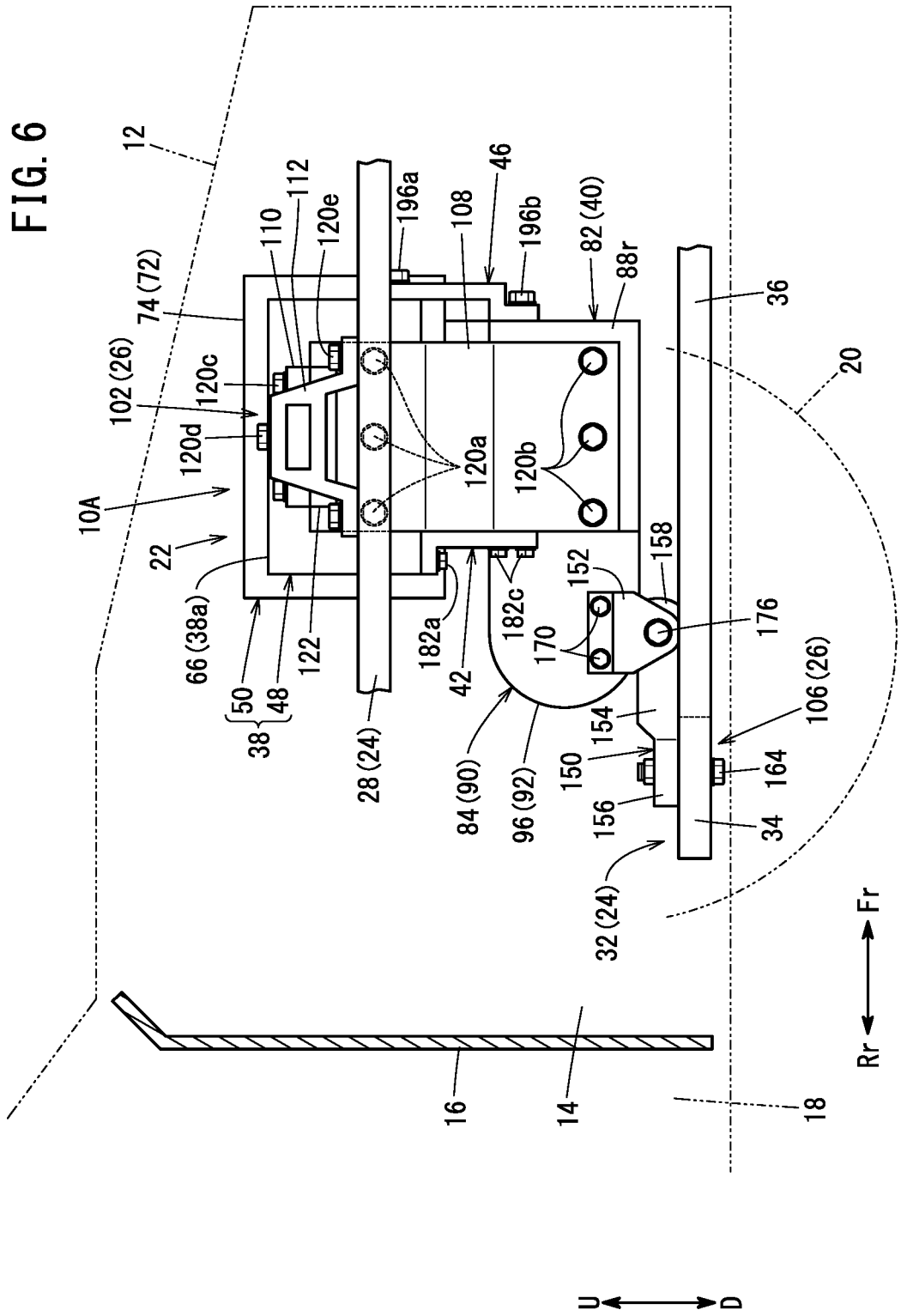
FIG. 6 is a right side view of the mounting structure.
Figure 7:
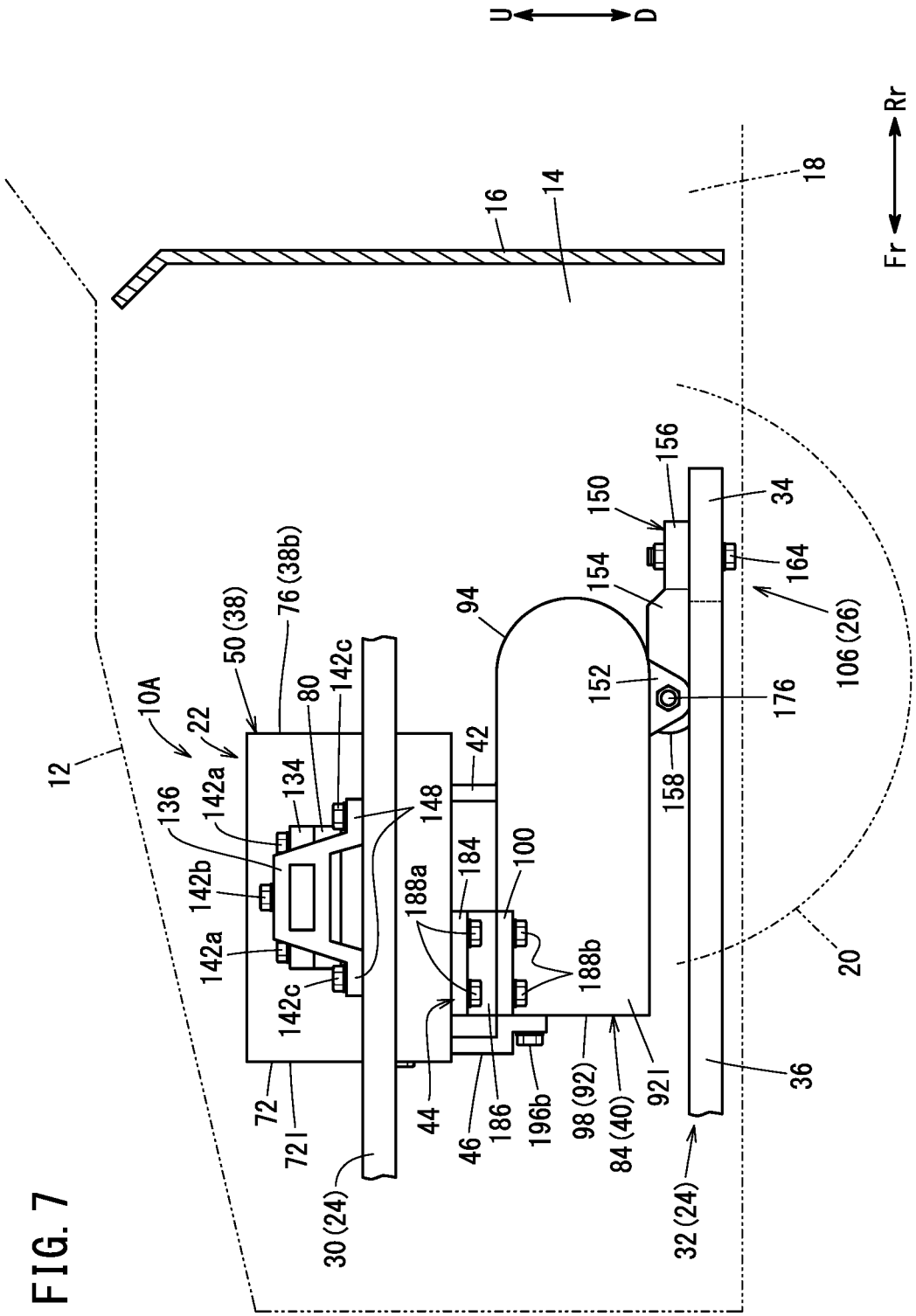
FIG. 7 is a left side view of the mounting structure.

As shown in FIGS. 6 and 7, a mounting structure 10A for a fuel cell drive system 22 according to the first embodiment of the present invention (hereinafter, simply referred to as "mounting structure 10A") is attached to a motor room 14 (front box) of a vehicle 12 (fuel cell vehicle). The motor room 14 is separated from a vehicle cabin 18 by a dashboard 16. The motor room 14 is located between the left and right front wheels 20.

In each of the drawings, with reference to the vehicle 12, a vehicle leftward direction as viewed from the driver's seat is indicated by an arrow "L", a vehicle rightward direction is indicated by an arrow "R", a vehicle forward direction is indicated by an arrow "Fr", a vehicle rearward direction is indicated by an arrow "Rr", a vehicle upward direction is indicated by an arrow "U", and a vehicle downward direction is indicated by an arrow "D".

Figure 1:
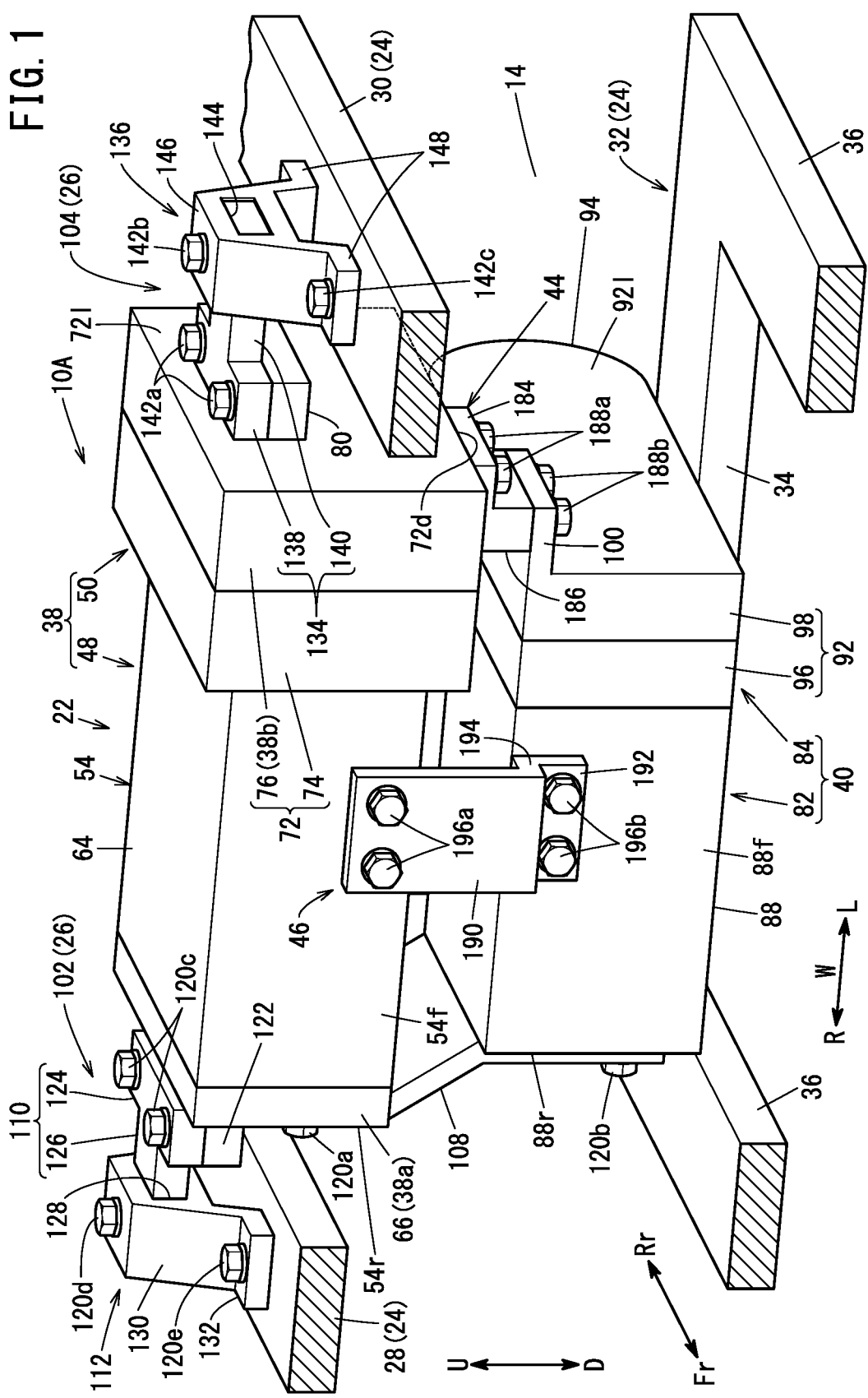
FIG. 1 is a perspective view of a mounting structure for a fuel cell drive system according to the first embodiment of the present invention, as viewed from the front of a vehicle.
Figure 2:
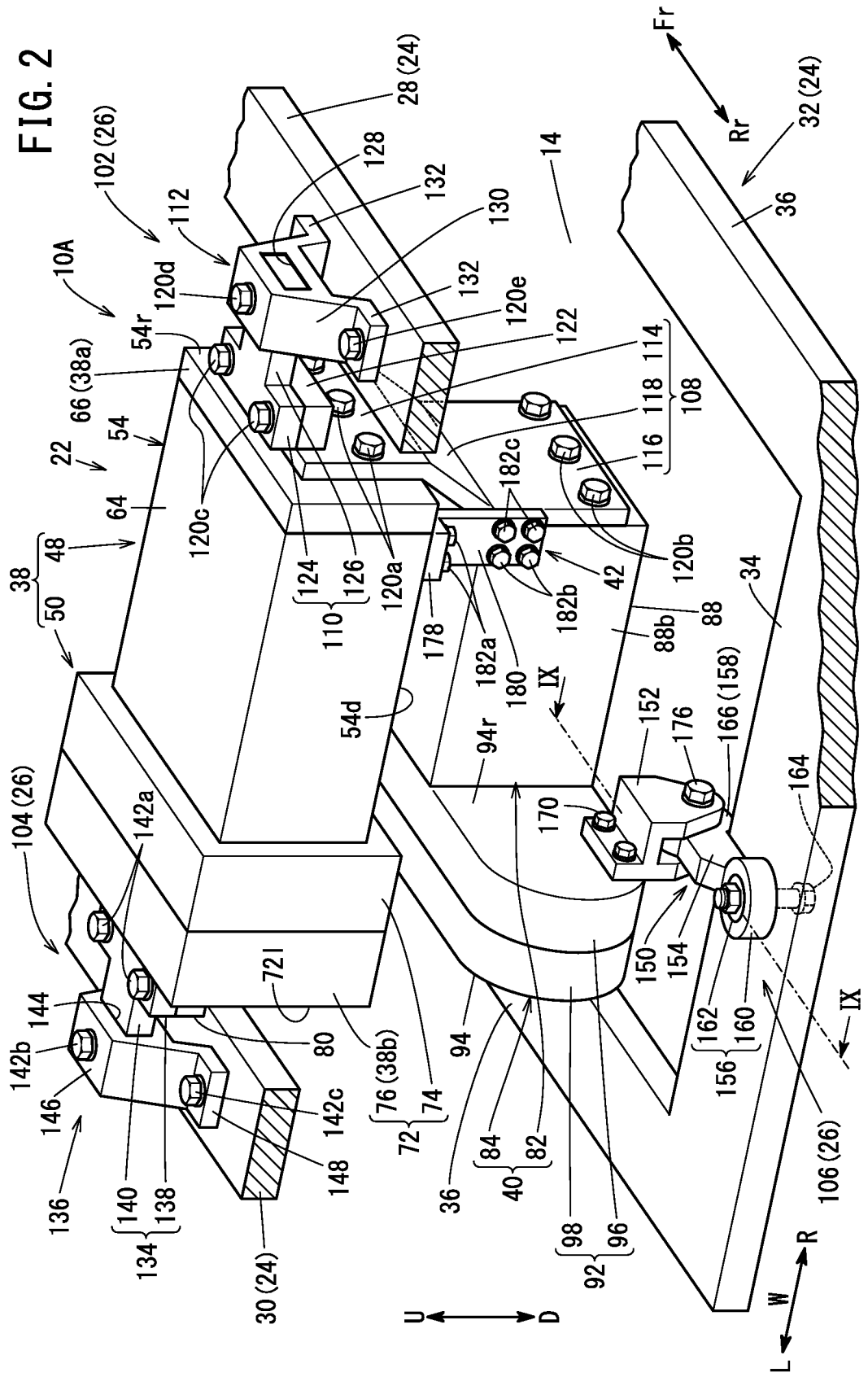
FIG. 2 is a perspective view of the mounting structure as viewed from the rear of the vehicle.

As shown in FIGS. 1 and 2, the mounting structure 10A includes a fuel cell drive system 22 and a mount member 26. The mount member 26 fixes the fuel cell drive system 22 to the vehicle body frame 24.

The vehicle body frame 24 includes a first frame 28, a second frame 30, and a third frame 32. The first frame 28 is positioned on the vehicle rightward direction (arrow R direction) of the fuel cell drive system 22, and extends along the vehicle front-rear direction (longitudinal direction of the vehicle). The second frame 30 is positioned on the vehicle leftward direction (arrow L direction) of the fuel cell drive system 22 and extends in the vehicle front-rear direction. The third frame 32 is positioned downward (arrow D direction) of the fuel cell drive system 22. The third frame 32 includes a main frame 34 and a pair of left and right sub-frames 36. The main frame 34 extends in the vehicle width direction (the arrow W direction). The pair of left and right sub-frames 36 extend in the vehicle forward direction (arrow Fr direction) from both ends of the main frame 34.

The fuel cell drive system 22 includes a fuel cell system 38, a drive unit 40, and first to third connecting members 42, 44, 46. The drive unit 40 is located under the fuel cell system 38. The first to third connecting members 42, 44, 46 connect the fuel cell system 38 and the drive unit 40 to each other.

Figure 5:
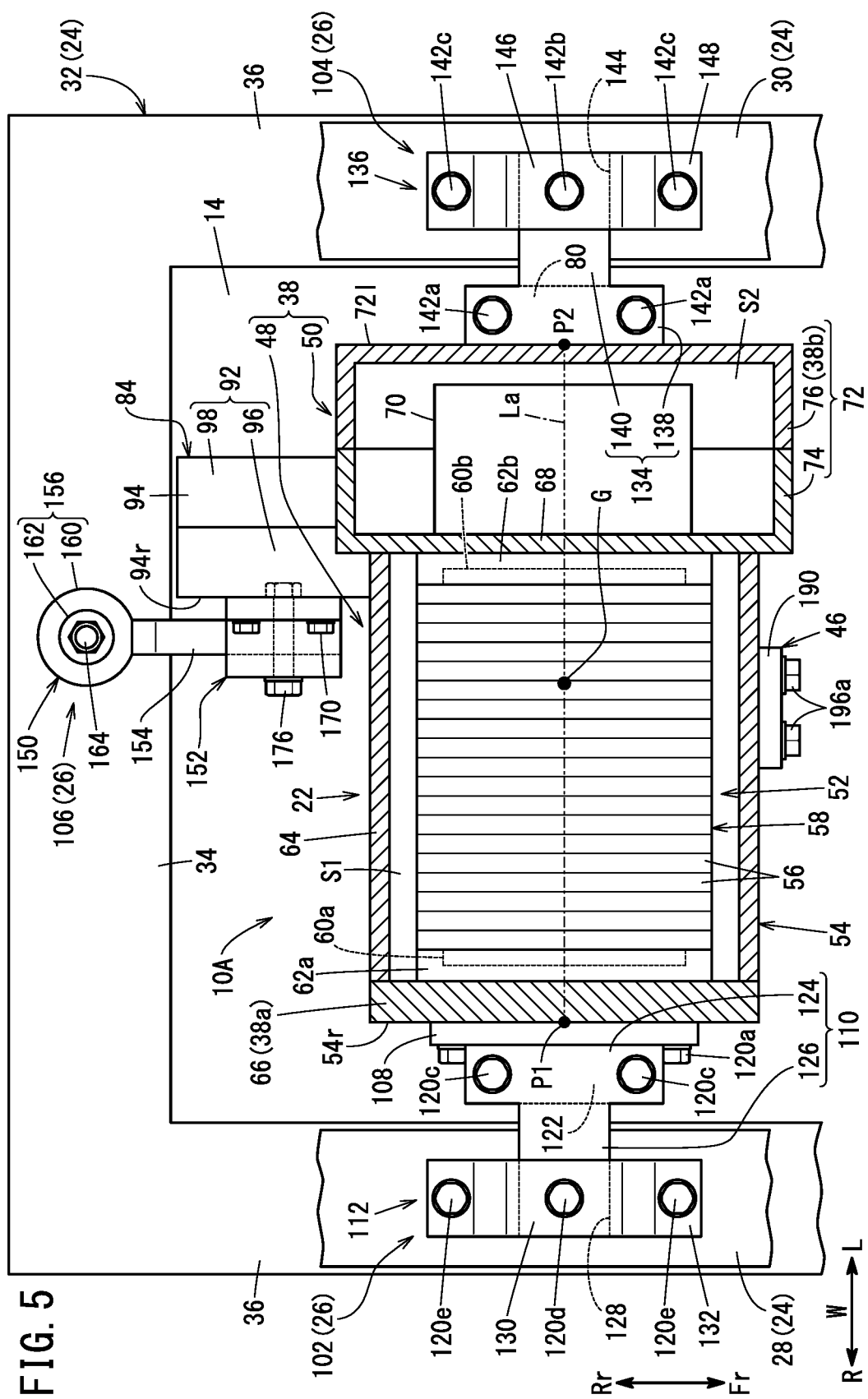
FIG. 5 is a cross-sectional view taken along line V-V of FIG. 3.

In FIG. 5, the fuel cell system 38 includes a fuel cell system main body 48 and an auxiliary device body 50 connected to the fuel cell system main body 48. The fuel cell system main body 48 includes a fuel cell stack 52 and a stack case 54 that houses the fuel cell stack 52. The fuel cell stack 52 includes a cell stack body 58. The cell stack body 58 includes a plurality of power generation cells 56 stacked one another. The plurality of power generation cells 56 are stacked along the vehicle width direction (arrow W direction).

A first terminal plate 60*a* and a first insulating plate 62*a* are disposed outward in this order (arrow R direction) at one end of the cell stack body 58 in the stacking direction (end on the arrow R side). A second terminal plate 60*b* and a second insulating plate 62*b* are disposed outward in this order at the other end of the cell stack body 58 in the stacking direction (end on the arrow L side). The fuel cell stack 52 includes the first terminal plate 60*a*, the first insulating plate 62*a*, the second terminal plate 60*b*, and the second insulating plate 62*b*.

Each of the first terminal plate 60*a* and the second terminal plate 60*b* is made of a conductive material (for example, a metal material such as cupper or aluminum). Each of the first insulating plate 62*a* and the second insulating plate 62*b* is made of, for example, a resin material having electrical insulating properties.

The power generation cell 56 generates power by electrochemical reactions between a fuel gas (for example, a hydrogen-containing gas) and an oxygen-containing gas. Although detailed illustration is omitted, the power generation cell 56 includes an MEA (membrane electrode assembly), and an anode separator and a cathode separator sandwiching the MEA.

The MEA includes an electrolyte membrane, an anode disposed on one surface of the electrolyte membrane, and a cathode disposed on the other surface of the electrolyte membrane. The anode separator has a fuel gas flow field for supplying fuel gas to the anode. The cathode separator has an oxygen-containing gas flow filed for supplying the oxygen-containing gas to the cathode.

The stack case 54 has a stack housing space S1 for housing the fuel cell stack 52. The stack case 54 has a rectangular shape when viewed in the up-down direction (the arrow U direction and the arrow D direction). Further, the stack case 54 has a rectangular shape as well when viewed from the vehicle front-rear direction (the arrow Fr direction and the arrow Rr direction). The long side of the stack case 54 extends along the vehicle width direction (the arrow W direction).

The stack case 54 includes a peripheral wall case 64, a first end plate 66, and a second end plate 68. The peripheral wall case 64 has a quadrangular tubular shape. The peripheral wall case 64 covers the outer peripheral surface of the fuel cell stack 52. The first end plate 66 is disposed at one end (an end on the arrow R side) of the peripheral wall case 64. The second end plate 68 is disposed at the other end (the end on the arrow L side) of the peripheral wall case 64. The stack housing space S1 is a space covered by the peripheral wall case 64, the first end plate 66, and the second end plate 68.

The first end plate 66 is joined to one end of the peripheral wall case 64 by bolts (not shown). The first end plate 66 closes an opening at the one end of the peripheral wall case 64. The second end plate 68 is joined to the other end of the peripheral wall case 64 by bolts (not shown). The second end plate 68 closes an opening at the other end of the peripheral wall case 64.

The auxiliary device body 50 includes a fuel cell auxiliary device 70 and an auxiliary device case 72 that houses the fuel cell auxiliary device 70. Although detailed illustration is omitted, the fuel cell auxiliary device 70 includes, for example, an anode system auxiliary device, a cathode system auxiliary device, and a coolant auxiliary device. The anode system auxiliary device supplies the fuel gas to the fuel cell stack 52. The cathode system auxiliary device supplies the oxygen-containing gas to the fuel cell stack 52. The coolant auxiliary device supplies the coolant to the fuel cell stack 52.

The auxiliary device case 72 has an auxiliary device housing space S2 for housing the fuel cell auxiliary device 70. The stack case 54 and the auxiliary device case 72 are arranged along the vehicle width direction (the arrow W direction). The auxiliary device case 72 is a protective case for protecting the fuel cell auxiliary device 70 housed in the auxiliary device housing space S2.

The auxiliary device case 72 includes a box-shaped first case member 74 and a box-shaped second case member 76. The first case member 74 is open in the arrow L direction. The second case member 76 is open in the arrow R direction. The first case member 74 and the second case member 76 are joined to each other by bolts (not shown). The first case member 74 includes the second end plate 68 described above. The second end plate 68 serves as both a wall portion of the stack case 54 and a wall portion of the auxiliary device case 72. In other words, the second end plate 68 is a partition wall between the stack housing space S1 and the auxiliary device housing space S2.

In FIGS. 1 and 3 to 5, the attachment protrusion 80 protrudes outward (in the direction of the arrow L) from an outer surface 721 of the auxiliary device case 72 facing in the vehicle leftward direction (the direction of the arrow L). The attachment protrusion 80 is positioned substantially at the center of the second case member 76 in the width direction of the second case member 76 (vehicle front-rear direction) (see FIG. 5).

As shown in FIG. 5, the fuel cell system 38 has a first end 38a and a second end 38b. The first end 38a is located at one end of the fuel cell system 38 in the vehicle width direction. The second end 38b is located at the other end of the fuel cell system 38 in the vehicle width direction. The first end 38a of the fuel cell system 38 constitutes an end portion (first end plate 66) of the stack case 54. The second end 38b of the fuel cell system 38 constitutes an end portion (second case member 76) of the auxiliary device case 72.

In FIGS. 1 to 4, the drive unit 40 includes a motor 82 and a speed reducer (reduction unit) 84. The motor 82 is located under the stack case 54. The speed reducer 84 is located under the auxiliary device case 72. The speed reducer 84 is coupled to the motor 82. The motor 82 and the speed reducer 84 are arranged along the vehicle width direction. In other words, the motor 82 is positioned on the vehicle right side of the speed reducer 84. In FIGS. 1, 2, and 5, the motor 82 is positioned within a projected area of the stack case 54 when the vehicle is viewed from above. In other words, the motor 82 does not protrude outward from the stack case 54 when the vehicle is viewed from above.

Figure 3:
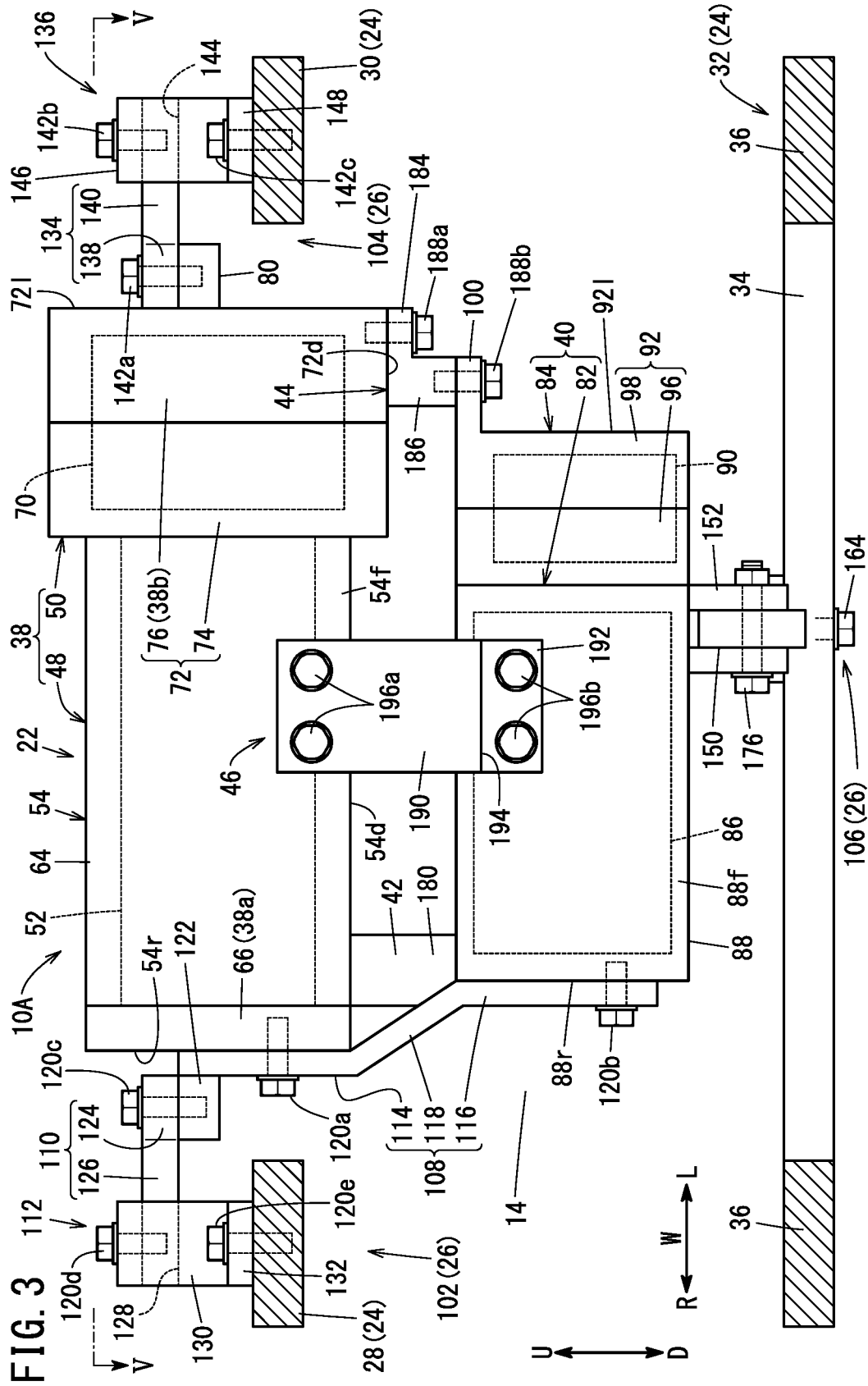
FIG. 3 is a front view of the mounting structure as viewed from the front of the vehicle.

In FIG. 3, the motor 82 includes a motor main body 86 and a motor case 88 that houses the motor main body 86. The motor main body 86 is rotationally driven by electric power supplied from the fuel cell stack 52 or a battery (not shown). The motor case 88 extends in the vehicle width direction (the arrow W direction).

The speed reducer 84 includes a speed reducer main body 90 and a speed reducer case 92. The speed reducer main body 90 transmits the rotational driving force of the motor 82 to an axle (not shown) in a state where the rotational driving force is reduced to rotate the axle at a predetermined rotational speed. The speed reducer case 92 houses the speed reducer main body 90. The speed reducer main body 90 includes a plurality of gears (not shown).

The speed reducer case 92 has an extended portion 94. The extended portion 94 extends further in the vehicle rearward direction (arrow Rr direction) than the rear surface 88b of the motor case 88 (see FIGS. 2 and 4). In FIGS. 1 to 4, the speed reducer case 92 includes a box-shaped first gear case 96 and a box-shaped second gear case 98. The first gear case 96 is open in the arrow L direction. The second gear case 98 is open in the arrow R direction. The first gear case 96 and the second gear case 98 are joined to each other by bolts (not shown).

Figure 4:
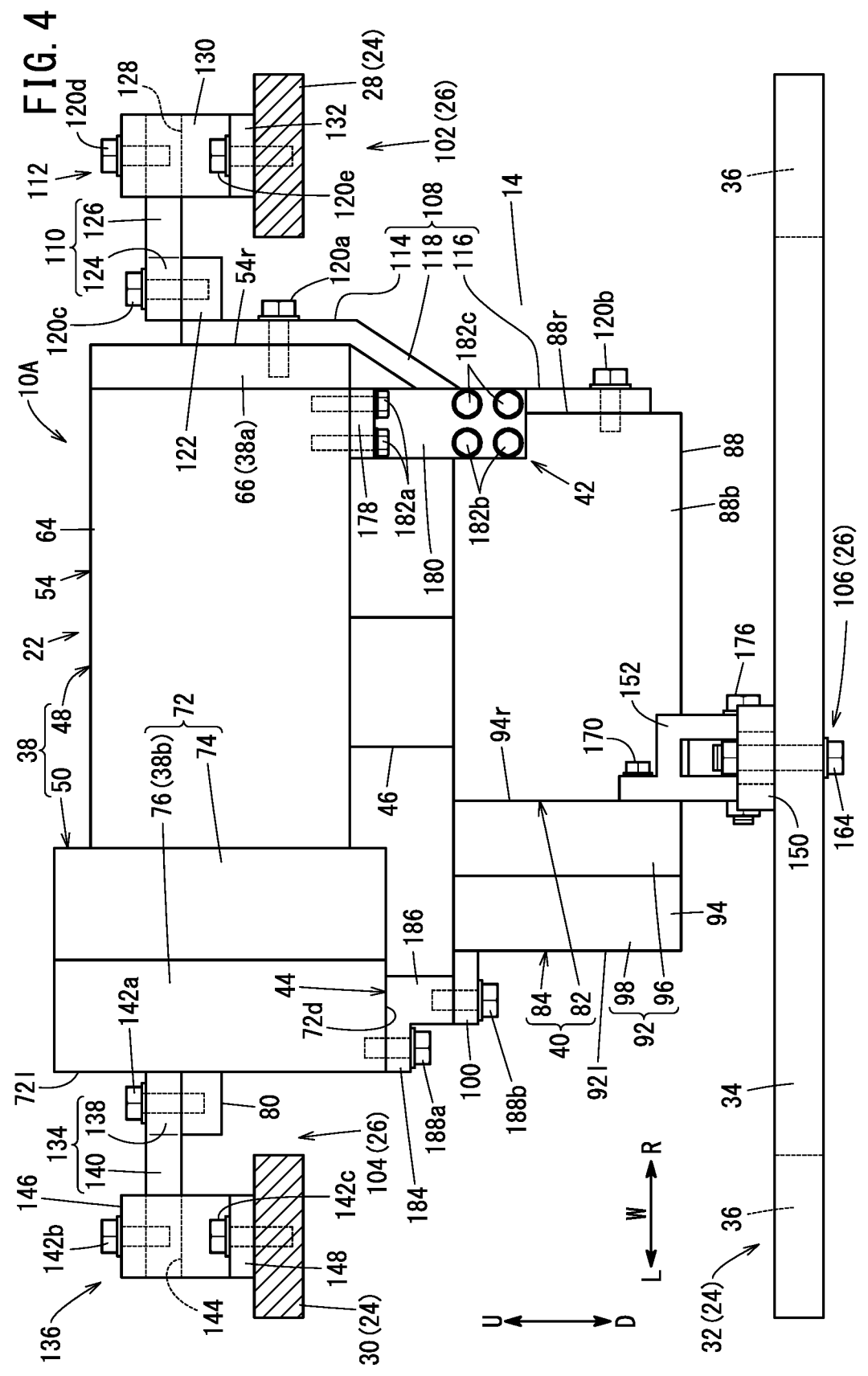

As shown in FIGS. 1, 3, and 4, the first gear case 96 is joined to an end of the motor case 88 on the arrow L side by bolts (not shown). An attachment flange 100 protrudes in the direction (arrow L direction) opposite to the motor case 88 from an outer surface 92l of the speed reducer case 92 facing in the arrow L direction.

Regarding the fuel cell drive system 22, the first to third connecting members 42, 44, 46 will be described later in detail.

As shown in FIGS. 1 and 2, the mount member 26 includes a first mount 102, a second mount 104, and a third mount 106.

In FIGS. 2 to 5, the first mount 102 fixes the first end 38a (first end plate 66) of the fuel cell system 38 to the first frame 28. The first mount 102 includes a connection frame 108, a first coupling member 110, and a first fixing member 112. The connection frame 108 is connected to both the end surface 54r of the stack case 54 on the arrow R side and the end surface 88r of the motor case 88 on the arrow R side. The first coupling member 110 is attached to the connection frame 108. The first fixing member 112 fixes the first coupling member 110 to the first frame 28.

The connection frame 108 is a plate member that is wide in the vehicle front-rear direction (see FIGS. 2 and 5). In FIGS. 2 to 4, the connection frame 108 includes a first connection plate 114, a second connection plate 116, and an intermediate plate 118. The first connection plate 114 faces the end surface 54r of the stack case 54. The second connection plate 116 faces the end surface 88r of the motor case 88. The intermediate plate 118 connects the lower end of the first connection plate 114 and the upper end of the second connection plate 116 to each other.

The first connection plate 114 is joined to an end surface 54r of the stack case 54 by a plurality of bolts 120a. The second connection plate 116 is joined to the end surface 88r of the motor case 88 by a plurality of bolts 120b. These bolts 120a and 120b extend in the vehicle width direction (the arrow W direction). The intermediate plate 118 is inclined in the direction of arrow L from the lower end of the first connection plate 114 toward the lower side of the vehicle. The attachment projection 122 projects outward (in the direction of the arrow R) from the outer surface (the surface on the arrow R side) of the first connection plate 114.

As shown in FIGS. 2 and 5, the first coupling member 110 includes a first attachment plate portion 124 and a first jutted portion 126. The first attachment plate portion 124 extends in the vehicle front-rear direction. The first jutted portion 126 juts out in the vehicle rightward direction (arrow R direction) from the first attachment plate portion 124. The first attachment plate portion 124 is joined to the upper surface of the attachment projection 122 by a plurality of bolts 120c. Each bolt 120c extends in the up-down direction.

In FIGS. 2 and 6, the first fixing member 112 includes a first fixing main body 130 and a pair of first legs 132. The first fixing main body 130 has a first insertion opening 128 into which the first jutted portion 126 is inserted. The pair of first legs 132 are connected to both sides of the first fixing main body 130 in the vehicle front-rear direction. The first insertion opening 128 is a through hole extending through the first fixing main body 130 in the vehicle width direction. The first jutted portion 126 is joined to the first fixing main body 130 by a bolt 120d in a state of being inserted into the first insertion opening 128. Each of the first legs 132 is joined to an upper surface of the first frame 28 by a bolt 120e. The bolt 120d and the pair of bolts 120e extend in the up-down direction.

In the first mount 102, the shapes and sizes of the connection frame 108, the first coupling member 110, and the first fixing member 112 can be appropriately set. Further, in the first mount 102, the shape, size, position, and number of the bolts 120a to 120e can be appropriately set.

In FIGS. 1 and 3 to 5, the second mount 104 fixes the second end 38b (second case member 76) of the fuel cell system 38 to the second frame 30. Specifically, the second mount 104 includes a second coupling member 134 and a second fixing member 136. The second coupling member 134 is attached to the attachment protrusion 80 of the auxiliary device case 72. The second fixing member 136 fixes the second connecting member 134 to the second frame 30.

As shown in FIGS. 1 and 5, the second connecting member 134 includes a second attachment plate portion 138 and a second jutted portion 140. The second attachment plate portion 138 extends in the vehicle front-rear direction. The second jutted portion 140 juts out from the second attachment plate portion 138 in the vehicle left direction (the arrow L direction). The second attachment plate portion 138 is joined to the upper surface of the attachment protrusion 80 by a plurality of bolts 142a. Each bolt 142a extends in the up-down direction.

In FIGS. 1 and 7, the second fixing member 136 includes a second fixing main body 146 and a pair of second legs 148. The second fixing main body 146 has a second insertion opening 144 into which the second jutted portion 140 is inserted. The pair of second legs 148 are connected to both sides of the second fixing main body 146 in the vehicle front-rear direction. The second insertion opening 144 is a through hole extending through the second fixing main body 146 in the vehicle width direction. The second jutted portion 140 is joined to the second fixing main body 146 by a bolt 142b in a state of being inserted into the second insertion opening 144. Each of the second legs 148 is joined to an upper surface of the second frame 30 by a bolt 142c. The bolt 142b and the pair of bolts 142c extend in the up-down direction.

In the second mount 104, the shapes and sizes of the second coupling member 134 and the second fixing member 136 can be appropriately set. Further, in the second mount 104, the shape, size, position, and number of the bolts 142a to 142c can be appropriately set.

As shown in FIG. 5, the center of gravity G of the fuel cell drive system 22 is located on a line segment La when the vehicle is viewed from above. The line segment La is a line segment connecting the first fulcrum P1 and the second fulcrum P2. The first mount 102 supports the fuel cell drive system 22 at the first fulcrum P1. The second mount 104 supports the fuel cell drive system 22 of the second fulcrum P2. As a result, the load of the fuel cell drive system 22 acts vertically downward on the first mount 102 and the second mount 104. That is, it is possible to prevent a moment from acting on the first mount 102 and the second mount 104.

As shown in FIGS. 2 to 9, the third mount 106 fixes the drive unit 40 to the main frame 34 of the third frame 32. The third mount 106 receives the moment acting on the fuel cell drive system 22. In other words, the third mount 106 functions as a rotation stopper that prevents rotation of the fuel cell drive system 22 relative to the vehicle body frame 24. The third mount 106 receives almost no load of the fuel cell drive system 22 in the gravity direction.

Figure 8:
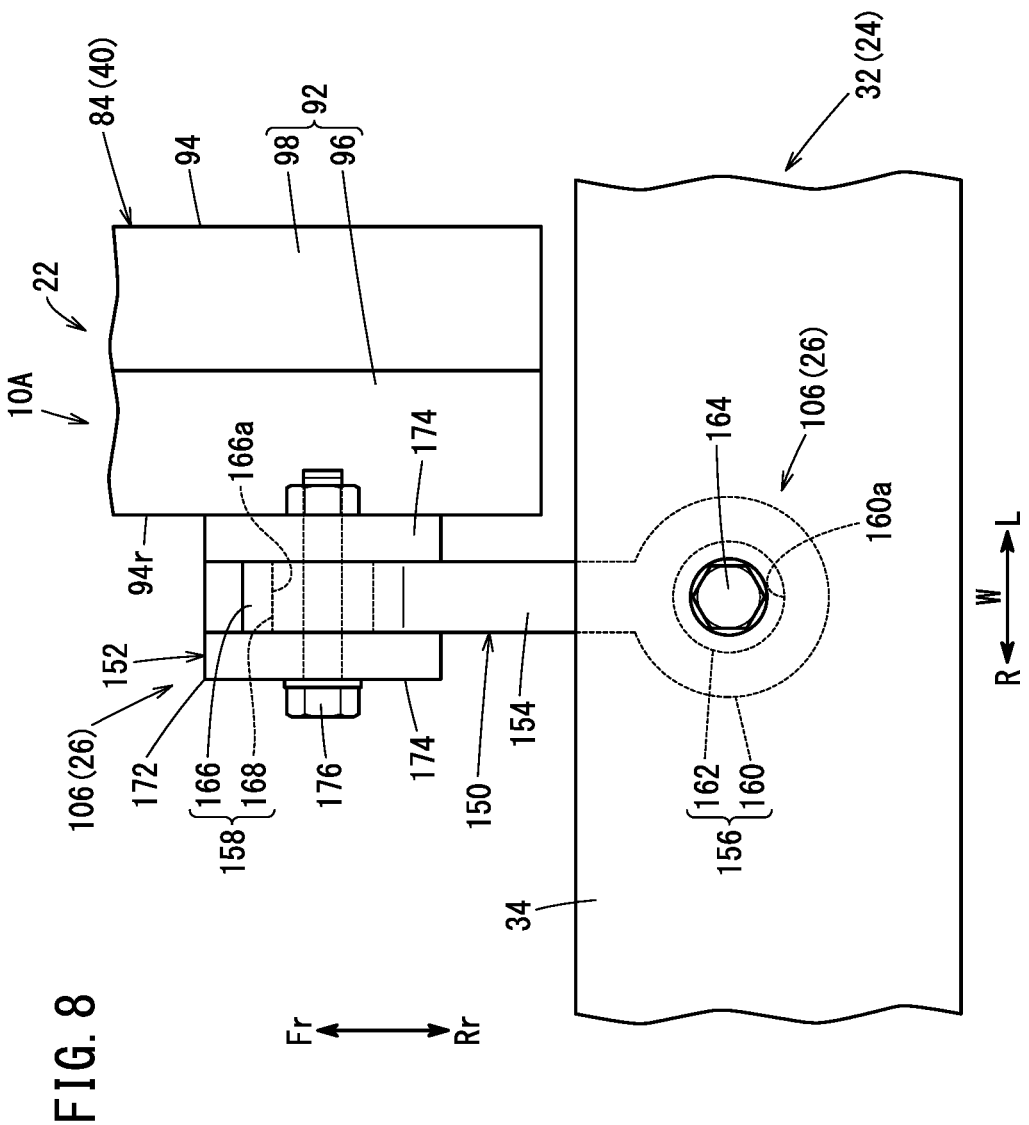
FIG. 8 is a bottom view of the mounting structure.
Figure 9:
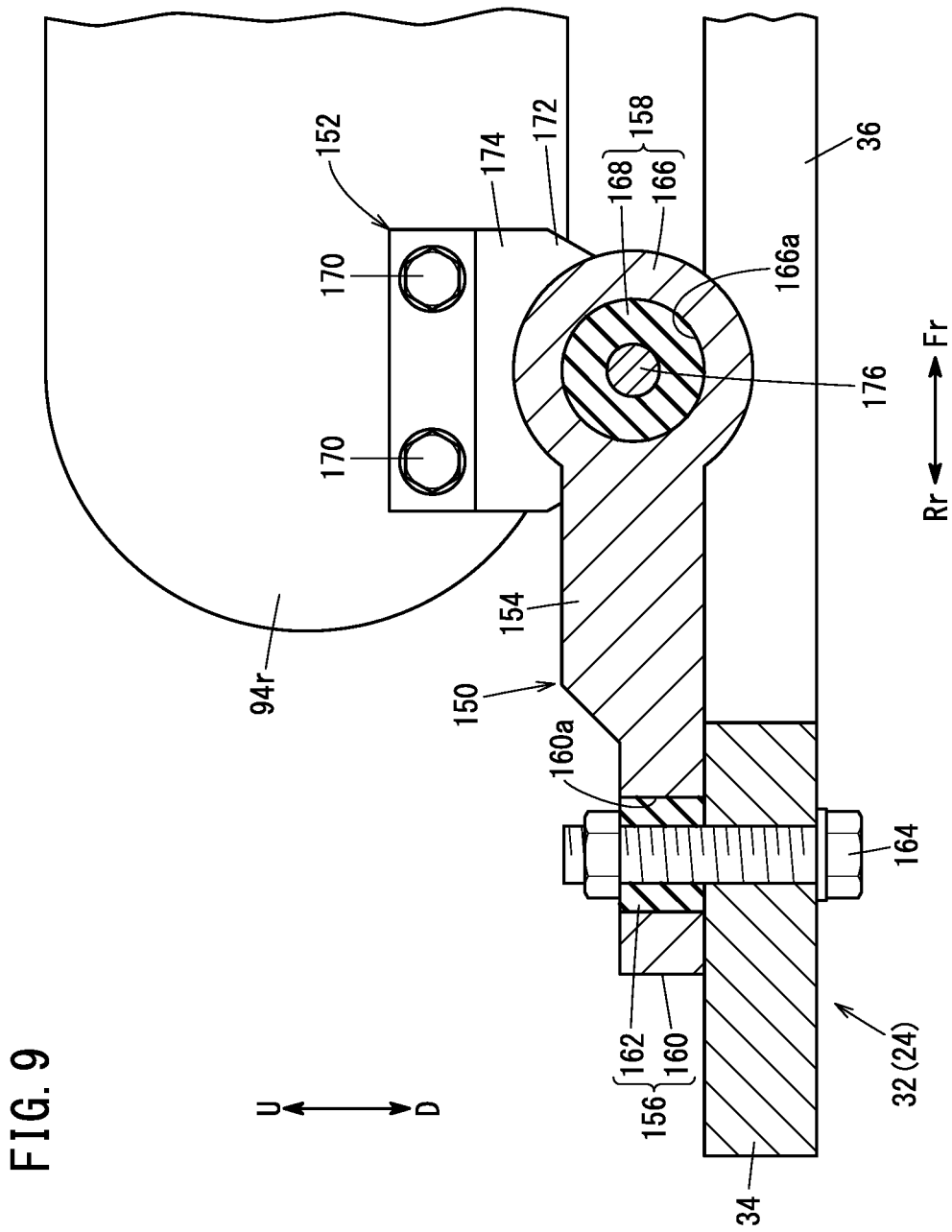
FIG. 9 is a cross-sectional view taken along line IX-IX of FIG. 2.

Referring to FIGS. 2, 8 and 9, the third mount 106 includes a torque rod 150 and a bracket 152. The torque rod 150 has an arm portion 154, a first attachment end portion 156, and a second attachment end portion 158. The arm portion 154 extends in the vehicle front-rear direction. The first attachment end portion 156 is connected to one end portion (an end portion on the vehicle rear side) of the arm portion 154. The second attachment end portion 158 is connected to the other end portion (an end portion on the vehicle front side) of the arm portion 154.

The first attachment end portion 156 includes a first annular portion 160 and a first elastic ring 162. The first annular portion 160 has a first inner through hole 160a extending in the up-down direction. The first elastic ring 162 is disposed in the first inner through hole 160a. The first attachment end portion 156 is joined to a vehicle width direction central portion of an upper surface of the main frame 34 by a bolt 164. The bolt 164 is inserted through an inner hole of the first elastic ring 162.

The second attachment end portion 158 includes a second annular portion 166 and a second elastic ring 168. The second annular portion 166 has a second inner through hole 166a extending in the vehicle width direction. The second elastic ring 168 is disposed in the second inner hole 166a.

The first elastic ring 162 and the second elastic ring 168 suppress transmission of vibrations from the drive unit 40 to the vehicle body frame 24.

The bracket 152 is joined by bolts 170 to a lower end portion of a surface 94r of the extended portion 94 of the speed reducer case 92 that faces the vehicle rightward direction. The bracket 152 includes a support portion 172 formed in a U-shape. The second attachment end portion 158 is inserted between a pair of wall portions 174 of the support portion 172 that face each other. The second attachment end portion 158 is joined to the pair of wall portions 174 by a bolt 176. The bolt 176 is inserted through an inner hole of the second elastic ring 168.

In the third mount 106, the shape, size, position, and number of the bolts 164, 170, 176 can be appropriately set.

As shown in FIGS. 2, 4, and 6, the first connecting member 42 connects an end portion of the stack case 54 on the vehicle right side and an end portion of the motor case 88 on the vehicle right side to each other. The first connecting member 42 includes a first upper connecting portion 178 and a first lower connecting portion 180. The first upper connecting portion 178 is connected to the stack case 54. The first lower connecting portion 180 is connected to the motor case 88.

The first upper connecting portion 178 extends, for example, in the vehicle front-rear direction. The first upper connecting portion 178 is joined to the lower surface 54d of the stack case 54 by a plurality of bolts 182a at the corner portion between the arrow R direction and the arrow Rr direction. That is, the first upper connecting portion 178 is located at the end portion of the lower surface 54d of the stack case 54 on the vehicle right side. Also, the first upper connecting portion 178 is located at the end portion of the lower surface 54d of the stack case 54 on the vehicle rear side. The bolts 182a extend in the up-down direction.

The first lower connecting portion 180 extends toward the lower side of the vehicle from an end portion of the first upper connecting portion 178 on the vehicle front side (on the arrow Fr side). In FIGS. 2 and 4, a plurality of bolts 182b join the first lower connecting portion 180 to an end portion of a rear surface 88b of the motor case 88 on the vehicle right side. The first lower connecting portion 180 is joined to a side surface (a surface facing in the vehicle rearward direction) of the connecting frame 108 of the first mount 102 by a plurality of bolts 182c. That is, the first connection member 42 is fixed to both the motor case 88 and the first mount 102.

As shown in FIGS. 1, 3, 4 and 7, the second connecting member 44 connects an end portion of the auxiliary device case 72 on the vehicle left side to an end portion of the speed reducer case 92 on the vehicle left side. The second connecting member 44 includes a second upper connecting portion 184 and a second lower connecting portion 186. The second upper connecting portion 184 is connected to the auxiliary device case 72 and the second lower connecting portion 186 is connected to the speed reducer case 92.

The second upper connecting portion 184 extends, for example, in the vehicle front-rear direction. A plurality of bolts 188a join the second upper connecting portion 184 to the lower surface 72d of the auxiliary device case 72 at the corner portion between the arrow Fr direction and the arrow L direction. That is, the second upper connecting portion 184 is located at the end portion of the lower surface 72d of the auxiliary device case 72 on the vehicle left side. Also, the second upper connecting portion 184 is located at the end portion of the lower surface 72d of the auxiliary device case 72 on the vehicle front side. Each bolt 188a extends in the up-down direction.

The second lower connecting portion 186 extends toward the lower side of the vehicle from the second upper connecting portion 184. The second lower connecting portion 186 is joined to the upper surface of the attachment flange 100 by a plurality of bolts 188b. The attachment flange 100 protrudes toward the vehicle left side from the upper portion of the speed reducer case 92. Each bolt 188b extends in the up-down direction.

As shown in FIGS. 1, 3, and 7, the third connecting member 46 connects an intermediate portion of the fuel cell system 38 in the vehicle width direction and an intermediate portion of the drive unit 40 in the vehicle width direction. The third connecting member 46 includes a third upper connecting portion 190, a third lower connecting portion 192, and an intermediate portion 194. The third upper connecting portion 190 is connected to the stack case 54. The third lower connecting portion 192 is connected to the motor case 88. The intermediate portion 194 connects the third upper connecting portion 190 and the third lower connecting portion 192 to each other.

The third upper connecting portion 190 extends in the up-down direction. The third upper connecting portion 190 is joined to the front surface 54f of the stack case 54 by a plurality of bolts 196a. The third lower connecting portion 192 extends in the up-down direction. The third lower connecting portion 192 is joined to the front surface 88f of the motor case 88 by a plurality of bolts 196b. The intermediate portion 194 extends rearward of the vehicle (in the direction of arrow Rr) from a lower end of the third upper connecting portion 190. An end of the intermediate portion 194 on the vehicle rear side is connected to an upper end of the third lower connecting portion 192.

The shapes and sizes of the first connecting member 42, the second connecting member 44, and the third connecting member 46 can be set as appropriate. In the first to third connecting members 42, 44, 46, the shape, size, position, and number of the bolts 182a, 182b, 182c, 188a, 188b, 196a and 196b can be set as appropriate.

The present embodiment has the following effects.

According to this embodiment, the first connecting member 42 connects the stack case 54 to the motor 82. The second connecting member 44 connects the auxiliary device case 72 to the speed reducer 84. Further, the first mount 102 connects the first end 38a of the fuel cell system 38 to the first frame 28. The second mount 104 connects the second end 38b of the fuel cell system 38 to the second frame 30. Therefore, the load of the fuel cell drive system 22 can be supported by the first frame 28 and the second frame 30. That is, the entire load of the fuel cell drive system 22 is distributed to the first frame 28 and the second frame 30 without being concentrated locally on the vehicle body frame 24. This makes it possible to reduce the weight of the vehicle body frame 24.

The first mount 102 connects the stack case 54 to the first frame 28. Therefore, the stack case 54 also functions as a stack support member that supports the fuel cell stack 52. Thus, it is not necessary to separately provide a stack support member. Further, the second mount 104 connects the auxiliary device case 72 to the second frame 30. Therefore, the auxiliary device case 72 also functions as an auxiliary device support member that supports the fuel cell auxiliary device 70. Therefore, it is not necessary to separately provide an auxiliary device support member. Therefore, the fuel cell drive system 22 can be reduced in size.

The mount member 26 includes the third mount 106. The third mount 106 connects the drive unit 40 to the third frame 32 of the vehicle body frame 24. The third mount 106 receives a moment acting on the fuel cell drive system 22.

According to such a configuration, the moment acting on the fuel cell drive system 22 can be efficiently received by the third mount 106. Therefore, the moment can be prevented from acting on the first mount 102 and the second mount 104.

The first mount 102 is connected to the end portion of the motor 82.

According to such a configuration, the load of the motor 82 can be efficiently supported by the first mount 102.

The first connecting member 42 is located at the first end 38a of the fuel cell system 38. The second coupling member 44 is located at the second end 38b of the fuel cell system 38. The fuel cell drive system 22 includes the third connecting member 46 that connects the intermediate portion of the fuel cell system 38 in the vehicle width direction to the intermediate portion of the drive unit 40 in the vehicle width direction.

According to such a configuration, the fuel cell system 38 and the drive unit 40 can be reliably integrated by the first connecting member 42, the second coupling member 44, and the third connecting member 46.

The center of gravity G of the fuel cell drive system 22 is located on the line segment La when the vehicle is viewed from above. The line segment La is a line segment connecting the first fulcrum P1 and the second fulcrum P2. The first mount 102 supports the fuel cell drive system 22 at the first fulcrum P1. The second mount 104 supports the fuel cell drive system 22 of the second fulcrum P2.

According to such a configuration, it is possible to prevent a moment from acting on the first mount 102 and the second mount 104.

Second Embodiment

Next, a mounting structure 10B of a fuel cell drive system 22 according to a second embodiment of the present invention (hereinafter, simply referred to as "mounting structure 10B" as well) will be described. In the mounting structure 10B according to the second embodiment, the same components as those of the above-described mounting structure 10A are denoted by the same reference numerals, and description thereof will be omitted.

Figure 10:
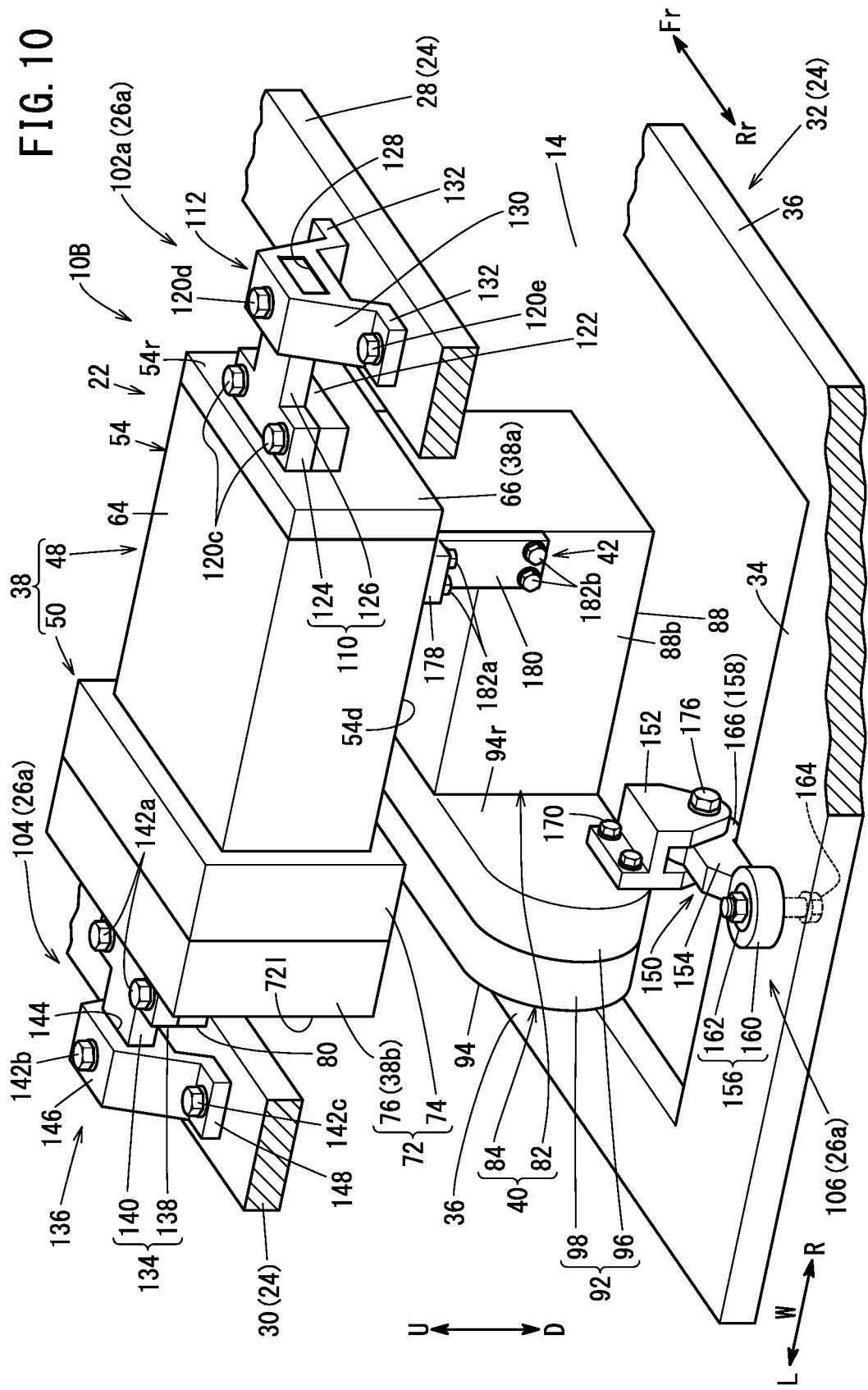
FIG. 10 is a perspective view of the mounting structure of the fuel cell drive system according to the second embodiment of the present invention as viewed from the rear of the vehicle.

As shown in FIG. 10, the mount member 26a of the mounting structure 10B has a first mount 102a instead of the above-described first mount 102. The first mount 102a includes a first coupling member 110 and a first fixing member 112. That is, the first mount 102a does not include the above-described connection frame 108. A plurality of bolts 120c join the first coupling member 110 to an attachment projection 122 that protrudes from an end surface 54r of the stack case 54 in the vehicle rightward direction (arrow R direction). The first lower connecting portion 180 of the first connecting member 42 is joined only to the motor case 88 by bolts 182b.

In the mounting structure 10B according to the present embodiment, the same configuration as that of the above-described mounting structure 10A provides the same operation and effect.

It should be noted that the present invention is not limited to the above described embodiment. Various structures can be adopted without departing from the gist of the present invention.

The above embodiments can be summarized as follows.

In the mounting structure (10A, 10B) for the fuel cell drive system according to the above-described embodiment, the mounting structure includes: the fuel cell drive system (22) includes the fuel cell system (38) including the stack case (54) that houses the fuel cell stack (52) and the auxiliary device case (72) that houses the fuel cell auxiliary device (70) and connected to the stack case; and the drive unit (40) configured to drive the vehicle (12); and the mount member (26, 26a) configured to fix the fuel cell drive system to the vehicle body frame (24) in a state in which the stack case and the auxiliary device case are arranged alongside of each other in the vehicle width direction, the drive unit includes the motor (82) disposed under the stack case and the speed reducer (84) disposed under the auxiliary device case and connected to the motor in the vehicle width direction, the mount member includes the first mount (102) connecting the first end (38a) forming an end of the stack case as one end of the fuel cell system in the vehicle width direction, to the first frame (28) of the vehicle body frame, and the second mount (104) connecting the second end (38b) forming an end of the auxiliary device case as another end of the fuel cell system in the vehicle width direction, to the second frame (30) of the vehicle body frame, and the fuel cell drive system includes the first connecting member (42) connecting the stack case and the motor to each other and the second connecting member (44) connecting the auxiliary device case and the speed reducer to each other.

In the mounting structure of the fuel cell drive system described above, the mount member may include the third mount (106) connecting the drive unit to the third frame (32) of the vehicle body frame and receiving a moment acting on the fuel cell drive system.

In the mounting structure of the fuel cell drive system described above, the first mount may be connected to an end portion of the motor.

In the mounting structure for the fuel cell drive system described above, the first connecting member may be located at the first end of the fuel cell system, the second connecting member may be located at the second end of the fuel cell system, and the fuel cell drive system may include a third connecting member (46) that connects an intermediate portion of the fuel cell system in the vehicle width direction and an intermediate portion of the drive unit in the vehicle width direction.

The center of gravity (G) of the fuel cell drive system may be located on the line segment (La) connecting the first fulcrum (P1) at which the first mount supports the fuel cell drive system and the second fulcrum (P2) at which the second mount supports the fuel cell drive system, when the vehicle is viewed from above.

What is claimed is:

1. A mounting structure for a fuel cell drive system, comprising:
   the fuel cell drive system comprising a fuel cell system including a stack case that houses a fuel cell stack and an auxiliary device case that is connected to the stack case and houses a fuel cell auxiliary device, and a drive unit configured to drive a vehicle; and
   a mount member configured to fix the fuel cell drive system to a vehicle body frame in a state in which the stack case and the auxiliary device case are arranged alongside together in a vehicle width direction, wherein the drive unit comprises:
   a motor disposed under the stack case; and
   a speed reducer disposed under the auxiliary device case and connected to the motor in the vehicle width direction, the mount member comprises:
   a first mount connecting a first end forming an end of the stack case as one end of the fuel cell system in the vehicle width direction, to a first frame of the vehicle body frame; and
   a second mount connecting a second end forming an end of the auxiliary device case as another end of the fuel cell system in the vehicle width direction, to a second frame of the vehicle body frame,
   the stack case comprises the first end and a case end opposite to the first end in the vehicle width direction and connected to the auxiliary device case,
   the motor comprises a first motor end portion and a second motor end portion opposite to the first motor end portion in the vehicle width direction and connected to the speed reducer,
   the fuel cell drive system comprises:
   a first connecting member connecting the stack case and the motor to each other; and
   a second connecting member connecting the auxiliary device case and the speed reducer to each other, and
   the first connecting member comprises an upper connecting portion fixed to the stack case and a lower connecting portion fixed to the first motor end portion of the motor.

2. The mounting structure according to claim 1, wherein the mount member further comprises a third mount connecting the drive unit to a third frame of the vehicle body frame to receive a moment acting on the fuel cell drive system.

3. The mounting structure according to claim 1, wherein the first mount is connected to the first motor end portion of the motor.

4. The mounting structure according to claim 1, wherein the first connecting member is located at the first end of the fuel cell system, and
   the second connecting member is located at the second end of the fuel cell system, and
   the fuel cell drive system further comprises a third connecting member connecting an intermediate portion of the fuel cell system in the vehicle width direction and an intermediate portion of the drive unit in the vehicle width direction to each other.

5. The mounting structure according to claim 1, wherein a center of gravity of the fuel cell drive system is located on a line segment connecting a first fulcrum at which the first mount supports the fuel cell drive system and a second fulcrum at which the second mount supports the fuel cell drive system, when the vehicle is viewed from above.

* * * * *